United States Patent [19]
Bowers

[11] Patent Number: 5,531,551
[45] Date of Patent: Jul. 2, 1996

[54] RIVET ASSEMBLY

[76] Inventor: James D. Bowers, 6559 Quarry La., Dublin, Ohio 43017

[21] Appl. No.: 314,671

[22] Filed: Sep. 29, 1994

[51] Int. Cl.⁶ .................................................. F16B 19/00
[52] U.S. Cl. ........................... 411/70; 411/344; 411/57; 24/607; 269/48.1
[58] Field of Search ..................... 411/44, 57, 60, 411/70, 344, 501; 24/607, 608, 453

[56] References Cited

U.S. PATENT DOCUMENTS

| | | | |
|---|---|---|---|
| 2,408,560 | 10/1946 | Keehn | 411/344 |
| 3,406,431 | 10/1968 | Armstrong | 411/57 |
| 3,709,088 | 6/1973 | Pitzer | 411/70 |
| 4,083,289 | 4/1989 | Erickson. | |
| 4,211,145 | 7/1980 | Dolch. | |
| 4,236,429 | 12/1980 | Dolch. | |
| 4,474,517 | 10/1984 | Navoczynski | 411/57 |
| 4,692,076 | 9/1987 | Herb | 411/57 |
| 5,028,187 | 7/1991 | Sato. | |
| 5,228,815 | 7/1993 | Gignac | 411/44 |
| 5,286,152 | 2/1994 | Anderson. | |

*Primary Examiner*—Flemming Saether
*Attorney, Agent, or Firm*—Francis T. Kremblas, Jr.

[57] ABSTRACT

A rivet type fastening device having a hollow rivet body, a pull shank slideably disposed within said hollow rivet body and including an enlarged mandrel head at one end. The opposing end of the pull shank is connected to a pivotally mounted actuator movably mounted between two positions for moving said mandrel head between condition with said rivet body or an unset condition extending outside said rivet body.

1 Claim, 1 Drawing Sheet

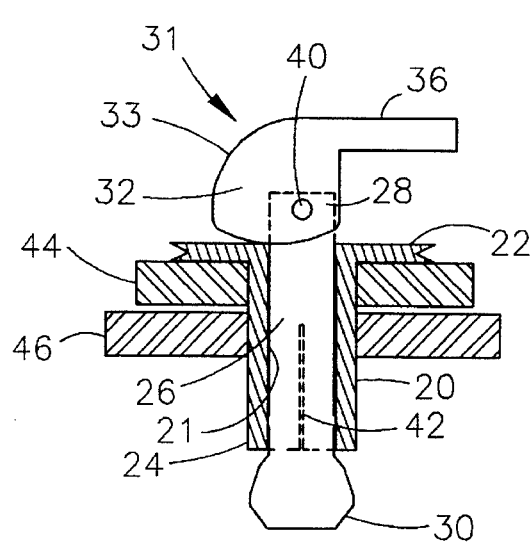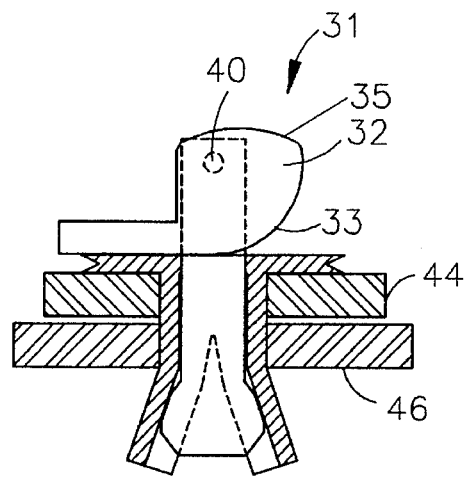
FIG 1     FIG 2
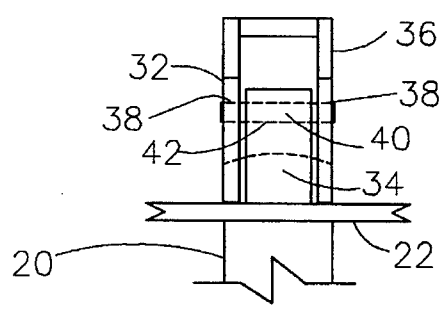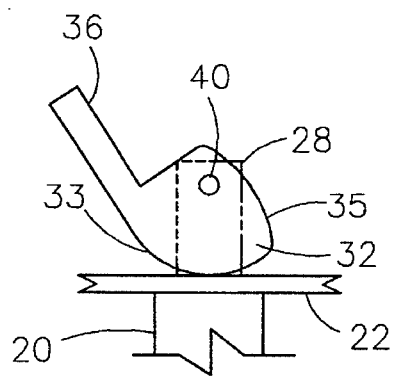
FIG 3     FIG 4
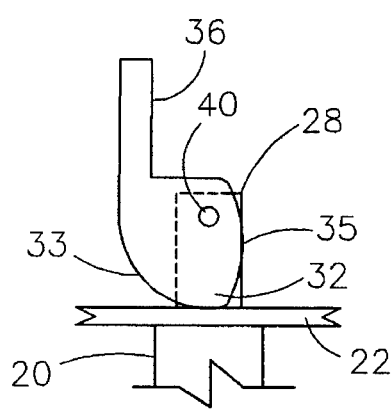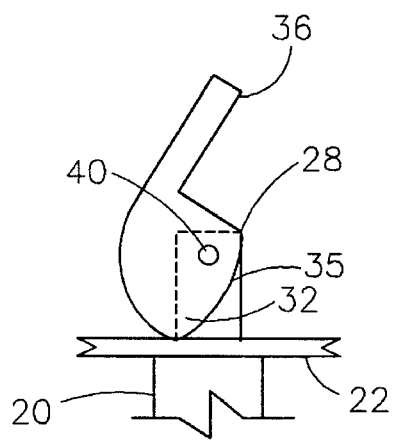
FIG 5     FIG 6

5,531,551

RIVET ASSEMBLY

TECHNICAL FIELD

The present invention relates generally to rivet type fastening devices and particularly to a re-usable rivet fastening device which incorporates an attached actuator for setting and unsetting the rivet.

BACKGROUND ART

Rivet type fastening devices are quite old in the art and include the hollow type rivet having a set head at one end which is set by a push type setting mandrel or a pull type setting mandrel.

The pull type setting mandrels typically include a pull shank which is slideably mounted in the axial bore of the hollow rivet body and have an enlarged mandrel head extending from the free end of the rivet body which is retracted into the axial bore toward the opposing end to expand the lower portion of the axial bore rivet body to set the rivet and couple the work pieces together.

In the pull type fasteners, typically a pulling or setting tool is required to pull the pull shank and force the mandrel head into a set condition.

Typical examples of both types of rivet type coupling devices are shown in U.S. Pat. Nos. 4,083,289; 5,286,152; 4,211,145; 5,028,187 and 4,236,429.

BRIEF DISCLOSURE OF INVENTION

The present invention relates particularly to a pull type rivet fastening device which is re-usable and includes a setting and unsetting actuator as part of the rivet assembly to releasably fix the rivet in a set or unset condition. The device of the present invention comprises a hollow rivet having a setting head and a free end and a setting mandrel having a pull shank axially slideably within said hollow rivet and an enlarged mandrel head normally disposed on one end of the pull shank beyond the free end of the hollow rivet.

The opposing end of the pull shank is provided with an actuator in the form of an enlarged body provided with an arm. The body includes a curved surface portion and is pivotally connected to the end of the pull shank at an eccentric position such that upon causing the actuator body to pivot between a set and unset position the pull shank is moved axially in the rivet body and the enlarged mandrel head is moved between a retracted set condition and an extended unset condition. In the preferred embodiment, the lower end of the hollow rivet includes opposing slots forming a pair of resiliently expandable legs for receiving the enlarged mandrel head to set the rivet for coupling a pair of members together.

BRIEF DESCRIPTION OF DRAWINGS

FIG. 1 is a front elevational view partially in section of a rivet fastening device constructed in accordance with the present invention and illustrated in an unset condition the section being taken along the centerline of the rivet body portion;

FIG. 2 is a front elevational view of the rivet fastening device shown in FIG. 1, illustrated in a set condition;

FIG. 3 is a partial side view of the rivet fastening device shown in FIG. 1 illustrating the connection between the actuator and the pull shank; and FIGS. 4, 5 and 6 are a partial front elevational views of the rivet fastening device shown in the preceding drawings illustrating the actuator portion in intermediate position between a set and unset condition.

DETAILED DESCRIPTION

A pull type rivet fastening device constructed in accordance with the present invention is shown in FIGS. 1–6 and includes a hollow rivet body portion 20 having an axial bore 21 and an integrally formed set head portion 22 and an opposing free end 24.

A setting mandrel including a pull shank 26 is slideably mounted in the bore 21 of hollow rivet body 20 and includes an upper end 28 and an opposing end having an enlarged mandrel head 30.

An actuator tab indicated generally at 31 includes a body portion comprising a pair of side walls 32 defining a central opening 34 adapted to receive the upper end 22 of shank 26 and an integrally formed, outwardly extending arm 36. Side walls 32 are provided with aligned holes or openings 38 for accepting a pin 40 which also extends through a channel 42 provided in upper end 28 of shank 26 which is aligned with openings 38.

Side walls 32 are configured to include a pair of curved peripheral surfaces 33 and 35 and the holes 38 are located relative to these surfaces to provide an eccentric motion when arm 36 is moved between the set and unset conditions shown in FIGS. 1 and 2.

Preferably, mandrel head 30 is provided with a maximum diameter nominally equal to the outer diameter of body portion 20 such that in the extended, unset condition, head 30 and body portion 20 can be inserted into appropriately sized aligned holes provided in the members 44 and 46, which are to be joined by the rivet assembly. Upon retracting mandrel head 30 into the axial bore of hollow rivet body 20, the inner diameter of bore 21 must be expanded to accept the mandrel head 30.

As arm 36 is lifted vertically and moved to the left from the unset condition shown in FIG. 1 toward the set condition shown in FIG. 2, pull shank 26 is drawn upwardly to retract the enlarged mandrel head 30 into the free end of rivet body 20.

In the preferred embodiment shown, rivet body 20 is provided with a pair of opposing slots 42 extending from the free end 24 upwardly to allow the bore 21 to resiliently expand to frictionally accept the enlarged mandrel head 30 as the side walls of the lower portion of rivet body 20 move outwardly beyond the diameter of the holes conventionally provided in the members or work pieces 44 and 46 which are to be fastened together.

Upon lifting arm 36 upwardly from the position shown in FIG. 1, pull shank 26 will be slideably moved upwardly to its highest position which occurs when the curved surface 33 begins to engage the setting head 22 of rivet body 20.

The configuration of walls 32 and the location of holes 38 accepting pin 40 are dimensioned relative to the desired size of the other parts, including the axial length of shank 26 and mandrel head 30 as may be required for fastening particular widths of members 44 and 46 together snugly.

Once shank 32 is moved upwardly to dispose pin 40 in its highest position shown in the set condition such as illustrated in FIGS. 2 and 4, continued rotation of arm 36 to the left as viewed in those FIGS. merely pivots arm 36 about pin 40 as the curved surface 33 of walls 32 slide along the upper surface of setting head 30. The radius of curved surface 33 is constant so that arm 36 may continue to be lowered to the position shown in FIG. 2 without further upward movement of shank 26 in the bore of hollow rivet body 20 and releasably locks mandrel head 30 in the set condition.

Similarly, upon reversing the movement of arm 36 to the right as viewed in FIG. 2, no axial movement of shank 26 within rivet body 20 will occur until the extreme right end of the curved surface portion 33 is moved beyond the vertical plane of pin 40 as seen in FIG. 6. Continued movement of arm 32 to the right then moves the relatively flatter curved surface portion 35 of walls 32 toward setting head 22 and permits shank 26 to be slideably lowered to push mandrel head 30 out of the free end 24 of rivet body 20 and into the unset condition.

With the mandrel head 30 disposed in the unset condition below the free end 24 of rivet body 20, the rivet fastening device may be simply removed as a unit from the holes in members 44 for re-use as desired. The mandrel head 30 has an outside diameter essentially equal to the outside diameter of rivet body 20 and both would be of an appropriate size to be slideably received in a relatively close fit in holes which may be conventionally provided in members 44.

To use the rivet fastening device of the present invention, one inserts the assembled rivet components disposed in the unset condition into aligned and selected size holes provided in members 44 in a conventional manner, such as by a drill or the like, which are commensurate with the size of the rivet device. Since the rivet assembly includes actuator 31 as one of its components, no other tools are necessary. One merely rotates arm 32 from the unset to the set condition as herein before described to dispose mandrel head 30 in the set position within the rivet body 20. To remove the rivet, this procedure is reversed as described herein to dispose shank 26 in the unset condition and the rivet device may then be re-used as needed.

Therefore, it should be readily appreciated that the rivet fastening device is easy to use, particularly for applications around the home where one may need to occasionally connect two members together and does not have the special tools otherwise required in prior art rivets currently available.

It is also applicable in such light duty applications wherein one wishes to make such a riveted connection in a releasable manner wherein disconnection is both convenient and does not require an additional tool.

I claim:

1. A rivet type fastening device for fastening a first and second member together through aligned holes in said members, comprising, in combination:

a) a rivet body including resilient outer walls defining a centrally disposed axial bore having a predetermined unexpanded diameter defining an unset condition, a set head at one end of said bore and a free end at an opposing end of said bore, said rivet body being slideably insertable through said aligned holes in said first and second members in the unset condition with said set head engaging a surface surrounding the hole in said first member;

b) a pull shank slideably received within said axial bore of said rivet body and including a first end provided with an enlarged mandrel head having a diameter essentially equal to the outside diameter of said rivet body, said mandrel head extending beyond said free end when said rivet body is disposed in said unset condition, and an opposing second end extending outwardly from said rivet body and through said set head;

c) an actuator including an outwardly extending arm fixed to a body portion provided with a cam surface, said body portion being pivotally mounted about a pivot pin to said second end of said pull shank, said cam surface being engagable with said set head of said rivet body such that upon rotation of said arm through a predetermined arc in a first direction, said pull shank is slideably moved within said axial bore in a direction toward said set head to draw said mandrel head into the free end of said axial bore in a releasably fixed position to resiliently expand a portion of the outer walls of said rivet body into engagement with a surface of said second member and defining a set condition; and wherein rotation of said arm and cam surface through said predetermined arc in an opposite second direction releases said enlarged mandrel head for movement outwardly from the free end of said axial bore causing said outer walls to resiliently return to an unexpanded condition with said axial bore in said unset condition, whereby said rivet body, pull shank and actuator may be freely extracted from said aligned holes in said first and second member as an integrally connected unit.

* * * * *